Figure 1:
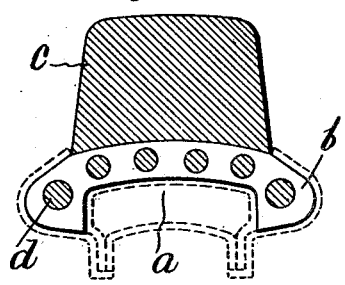

Dec. 16, 1924.

B. VON LOUTZKOY

LAMINATED TIRE

Original Filed Dec. 11, 1920

1,519,178

Inventor
Boris von Loutzkoy
C. P. Goepel
Attorney

Patented Dec. 16, 1924.

1,519,178

UNITED STATES PATENT OFFICE.

BORIS VON LOUTZKOY, OF BERLIN, GERMANY.

LAMINATED TIRE.

Application filed December 11, 1920, Serial No. 430,073. Renewed June 20, 1924.

*To all whom it may concern:*

Be it known that I, BORIS VON LOUTZKOY, a subject of Russia, and residing at Berlin W., Viktoria Luiseplatz 1, Germany, have invented certain new and useful Improvements in Laminated Tires, of which the following is a specification.

The invention relates to laminated tires for the wheels of vehicles of all kinds, the tires consisting of laminæ of a yielding substance strengthened by strengthening members embedded in the said substance. The strengthening members are placed at the foot of the laminæ, each member being located at the middle of its lamina.

The invention is illustrated in the drawing in which—

Fig. 1 is a cross section, and

Figure 2:
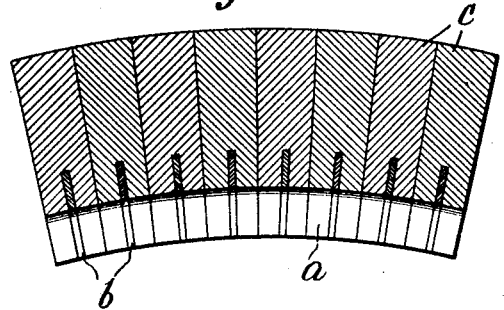

Fig. 2 a longitudinal section of a part of a tire whose inner periphery has a groove into which the rim of the wheel fits.

Figure 3:
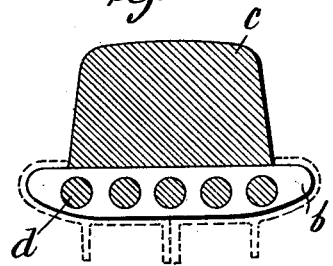

Fig. 3 is a cross section, and

Figure 4:
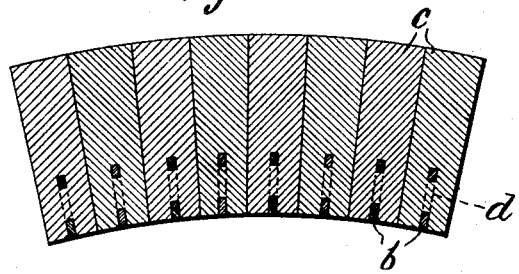

Fig. 4 a longitudinal section of a laminated tire adapted to fit into an ordinary wheel rim.

Figure 5:
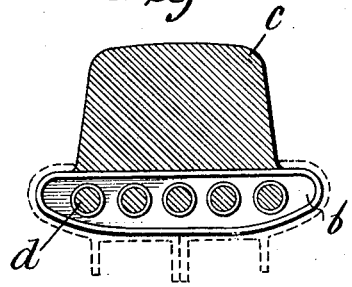

Fig. 5 is a cross section, and

Figure 6:
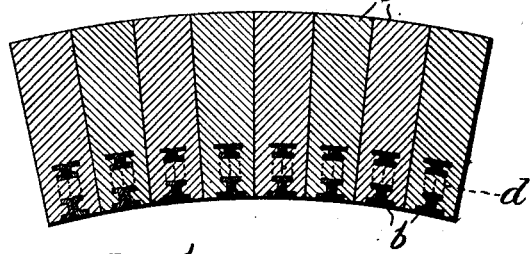

Fig. 6 a longitudinal section of a tire with a special form of ribbed strengthening members.

Figure 7:
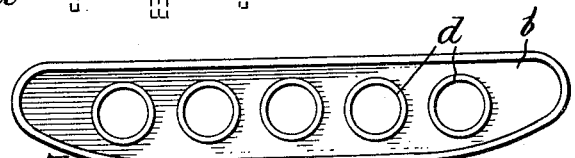

Fig. 7 is a side view, and

Figure 8:
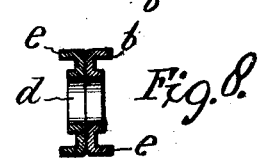

Fig. 8 a cross section on an enlarged scale of the strengthening member used in Figs. 5 and 6.

Figure 9:
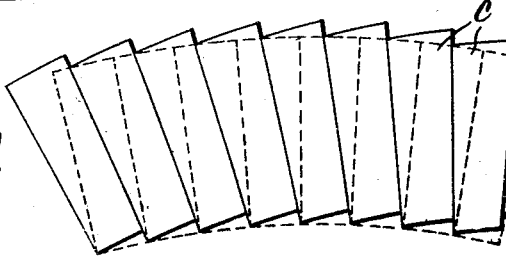

Fig. 9 shows how the laminæ of the tire become displaced if no proper strengthening members are employed.

Referring to the drawing $c$ designates a plurality of sections or laminations having the general outline of the cross-sectional configuration of a tire and which are adapted to be used in a large number for making up the annular tire body. These laminations or sections $c$ extend transversely when assembled into tire form and have the general exterior configuration of tires now in general use.

For the purpose of firmly anchoring these sections $c$ to a rim, the sections are provided with reinforcements $b$ preferably stamped from sheet metal and provided with suitable apertures therein for the purpose of receiving therethrough the rubber or other material $d$ of which the sections $c$ are made. These reinforcements $b$, as shown in Figs. 1 and 2, may be notched or cut out at their inner edges to provide a groove or depression in the inner periphery of the tire and into which is adapted to fit a filler member $a$ which is carried by the wheel, the ends of the reinforcements $b$ projecting laterally beyond the body portion of the tire and in position to receive the usual clamping flanges or rings employed, and as shown in dotted lines in Fig. 1.

In Figs. 3 and 4 a slight modification is shown in the construction of the reinforcing members, the same having uninterrupted inner edges adapted to seat flat within an ordinary clincher rim for supporting the tire thereon, the clincher rim being shown in dotted lines in Fig. 3.

A further modified form is disclosed in Figs. 5 to 8 inclusive and wherein the reinforcing members are stamped from sheet metal or the like and constructed each of a pair of plates with outturned marginal flanges, the flanges also extending around the apertures $d$ through which the material of the sections $c$ is adapted to be molded. As shown in Fig. 8, the marginal flanges $e$ are out-turned so as to reinforce the plates and afford a relatively wide bearing surface for the reinforcement against a rim or other support for the tire, and to also afford a suitable anchor for maintaining the reinforcement in the moldable section.

The purpose of providing these reinforcements in the bases of the tire sections is not only to hold such sections to a rim or felly, but to also hold the sections $c$ from tilting or canting, as shown in full lines in Fig. 9. When the sections are permitted of this movement, considerable wear and friction is imposed on and between the parts $c$ so that the life of the tire is considerably decreased and the desired resiliency is offset. The dotted lines in Fig. 9 show the normal and correct positions of the parts $c$, and the anchoring of the reinforcements in the bases of the parts and the projecting of the reinforcements beyond the sides of the parts for interlocking engagement with the attaching flanges, is found to prevent this undesirable canting or tilting of the sections.

What is claimed is:

In a tire composed of transversely disposed laminations, a reinforcement for each lamination comprising an apertured plate embedded in the base of the lamination and having an inner edge conforming to the wheel body upon which the tire is adapted to be mounted, said plate extending at opposite ends laterally beyond the sides of the tire for interlocking engagement with the retaining flanges of the wheel body.

In testimony whereof I affix my signature in presence of two witnesses.

BORIS von LOUTZKOY.

Witnesses:
  A. LEUGE,
  E. LEUGE.